United States Patent Office 2,729,441
Patented Jan. 3, 1956

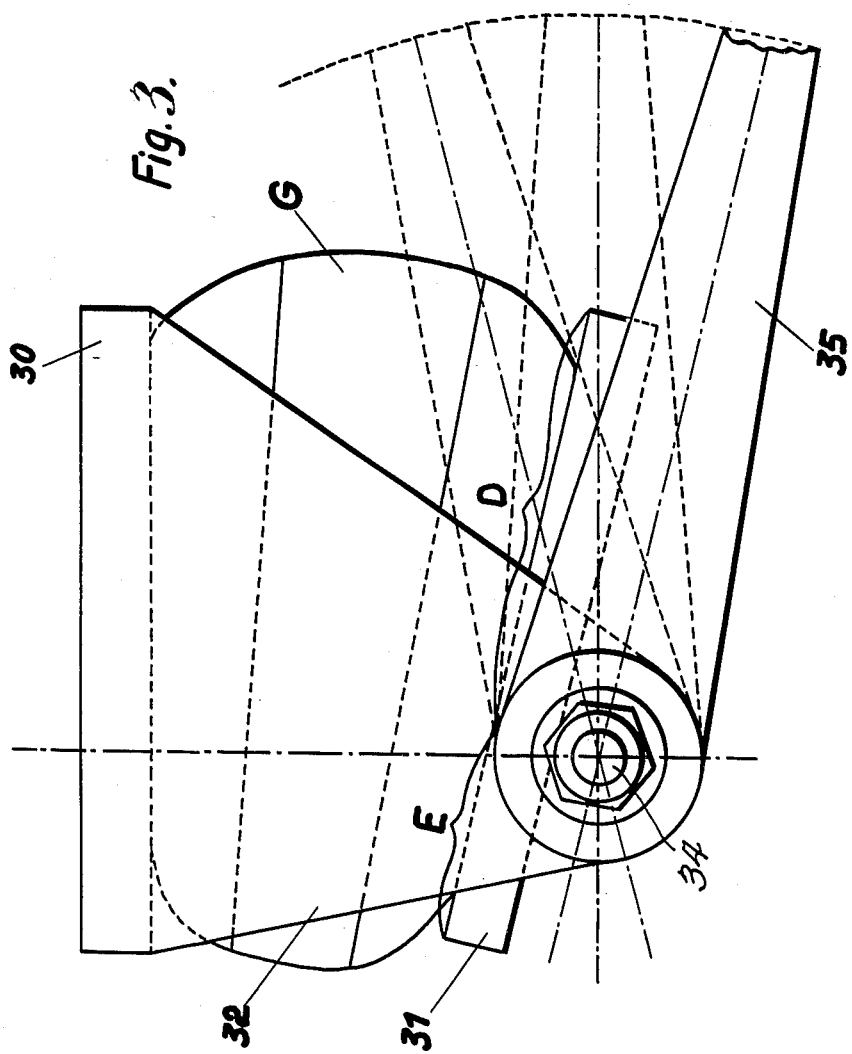

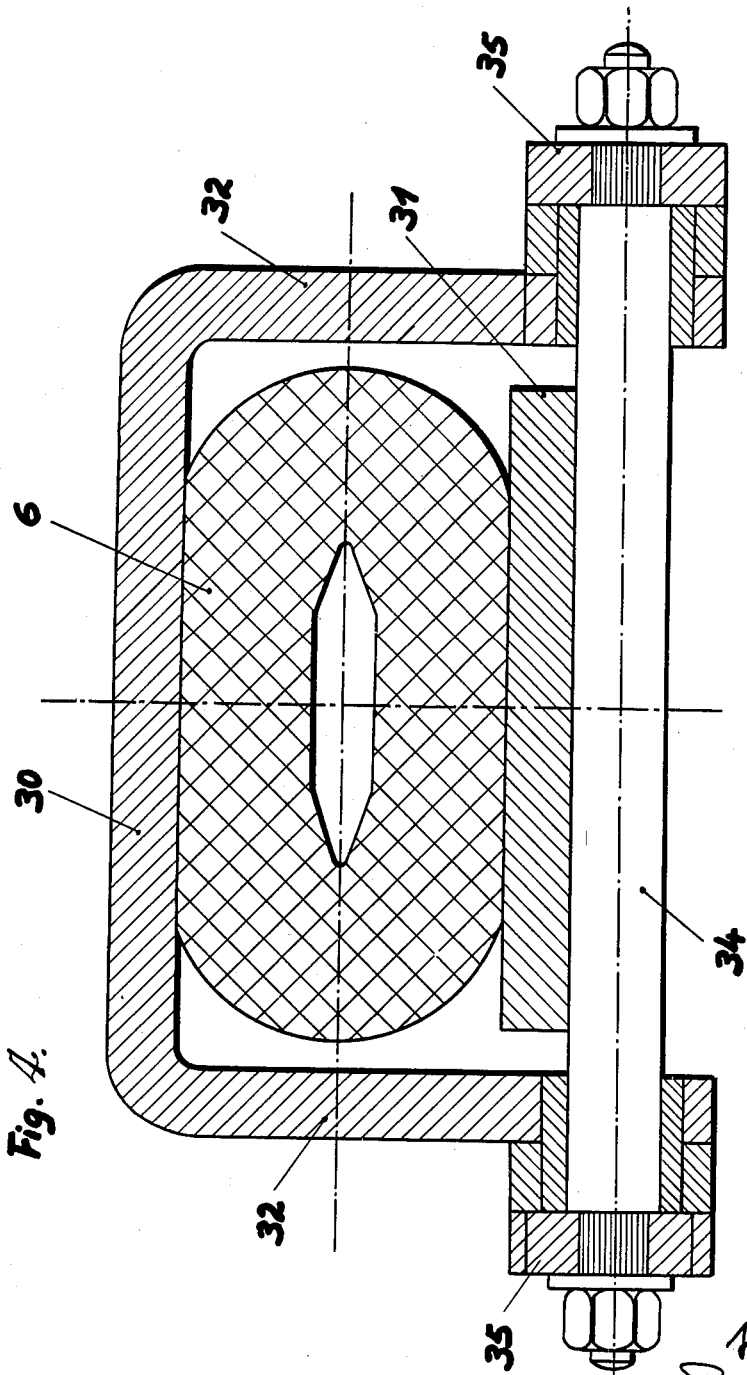

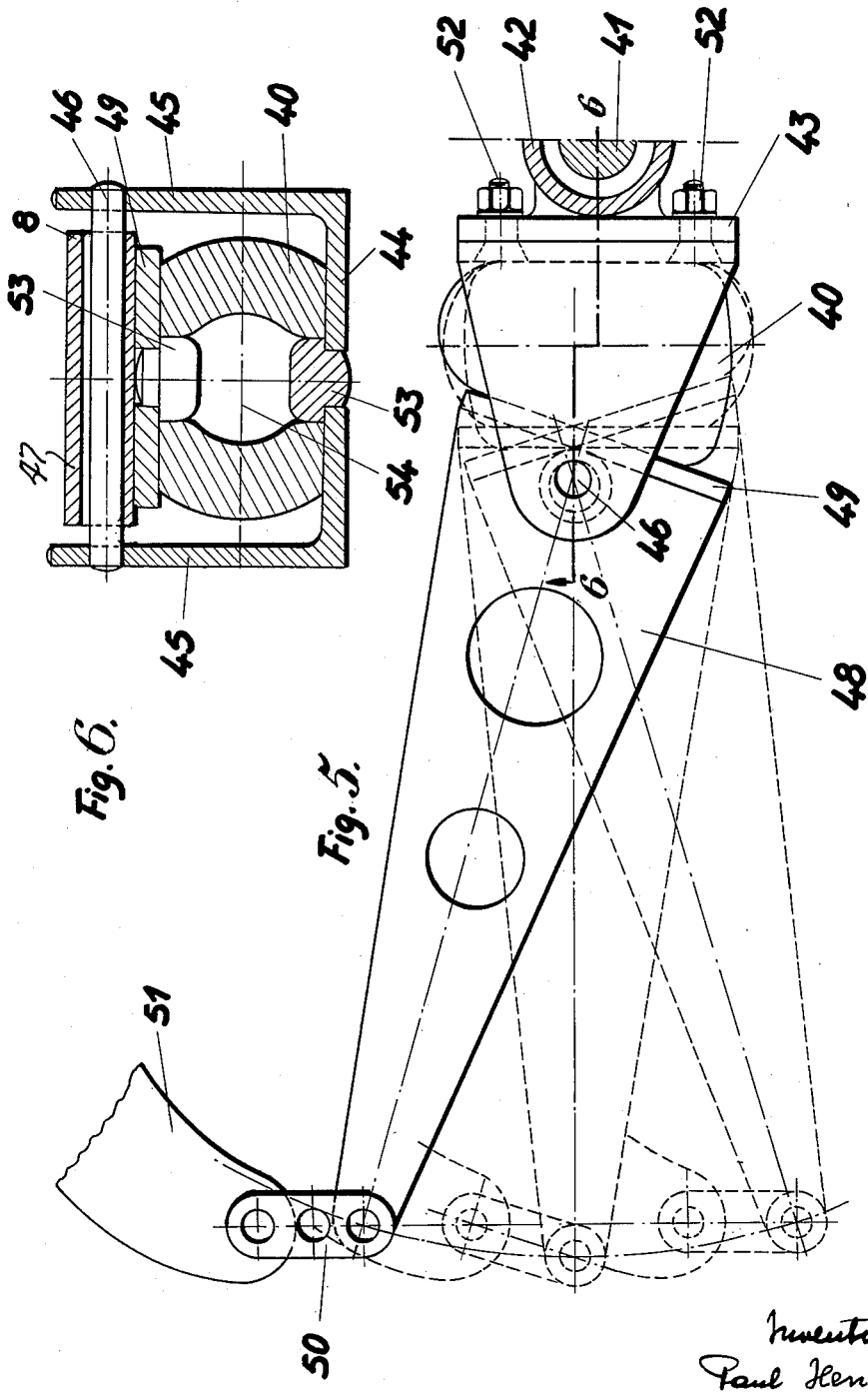

2,729,441

SUSPENSION SYSTEM, ESPECIALLY FOR VEHICLES

Paul Henss, Einbeck, Hannover, Germany

Application February 10, 1953, Serial No. 336,155

3 Claims. (Cl. 267—21)

The present invention relates to a suspension system in which a hollow rubber body of resilient material in the form of a ring or cylinder is arranged between two parts to be suspended against each other by means of suitable securing elements. The hollow body may be provided with seats and a mounting each on its top and bottom sides, which receive suitable securing elements. The hollow body is formed of two cups, their wide sides facing each other and connected with each other at the point of impact. The bottom parts of said cups have an opening which is utilized for securing the resilient body.

It is one object of the present invention to provide a suspension system, especially for vehicles in which a hollow rubber body is mounted, under a certain pre-load, between two plates, one of which is arranged outside the centerline of the hollow body and tiltable in relation to the other plate, and is provided with a lever which acts on the part to be suspended. In this way the hollow body is mounted eccentrically and is pre-loaded so that a springing and an absorbing effect is achieved.

With these and other objects in view which will become apparent in the following detailed description, the present invention will be clearly understood in connection with the accompanying drawings, in which:

Fig. 3 is the suspension system shown in Fig. 2 in another working position;

Fig. 4 is a section along the lines 4—4 of Fig. 2;

Fig. 5 is a fragmentary side elevational view of another application of the suspension arrangement;

Fig. 6 is a section along the lines 6—6 of Fig. 5; and

Fig. 7 is a side elevational view of another embodiment of the present invention with three hollow bodies.

Figure 1:
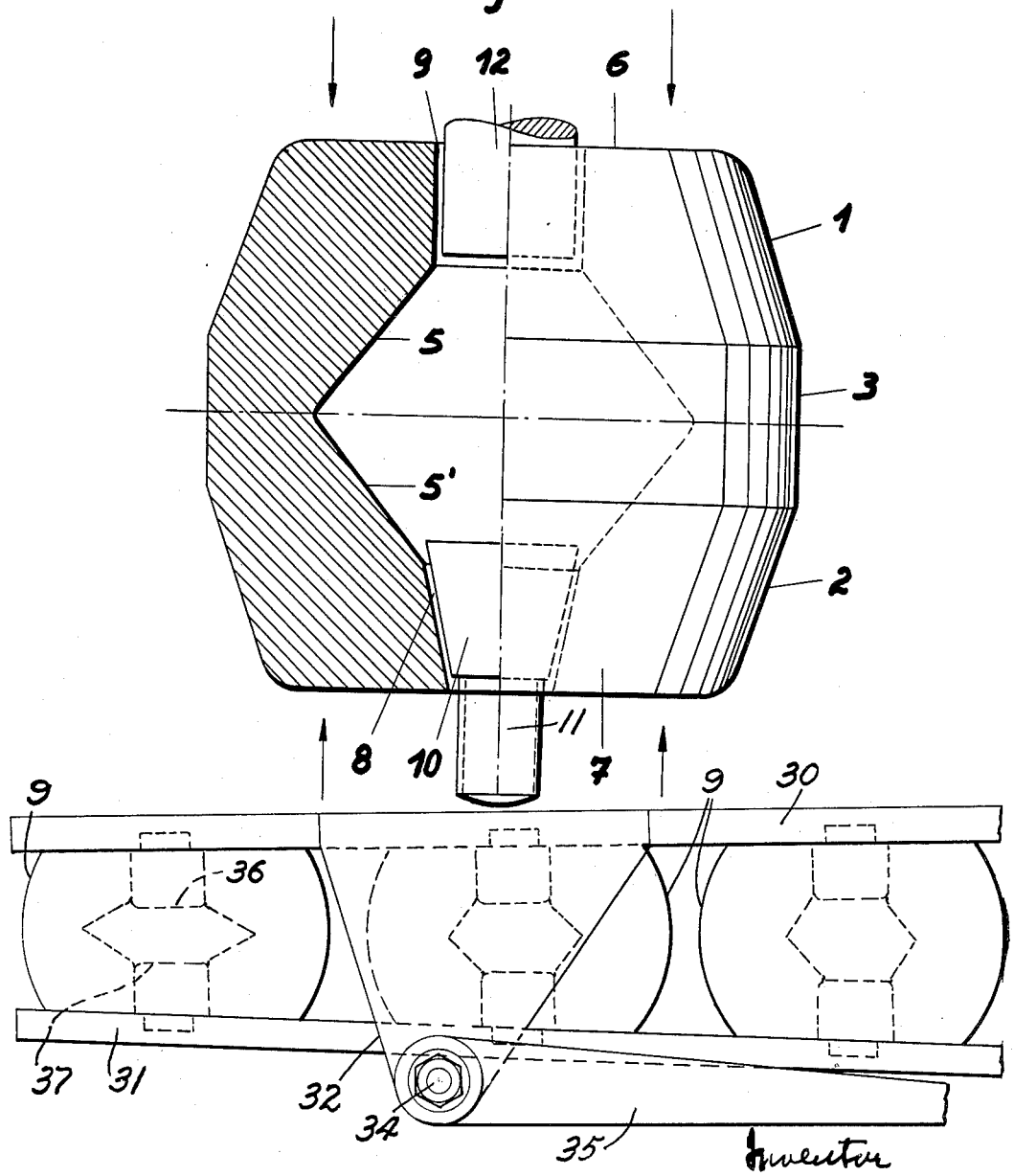
Figure 1 is a side elevational view of one embodiment of the present invention, partly in section.

Fig. 1 shows that the hollow body of resilient material forms a ring or, respectively, two cups with their open sides facing each other. Thus the hollow body consists of two truncated cones 1 and 2 with a cylindrical portion 3 between them.

However, the outside shape of the hollow body may also be formed like a sphere or like an ellipsoid or the like. The inside of the body is a cavity 4 which is limited by the walls 5 and 5'. Top and bottom of said body are plane seats 6 and 7, respectively. An opening 8 and, respectively, 9 is provided in the bottom and in the top of the body. Opening 9 has a diameter somewhat greater than that of opening 8, which is tapered towards seat 7. Opening 8 is used for fastening the body to another machine part in that through the opening 8 a securing bolt 11 with a tapered head 10 is inserted which at the inside fits into opening 8 and which is connected with the machine element. A securing bolt 12 situated on the other machine part, fits into the opening 9 and serves as a lock against lateral movement. In the opening 9 there is enough play for the bolt 12 so that when compressing the body in the direction marked by arrows in Fig. 1 the air contained in the cavity may be released. Fig. 1 shows clearly that in the middle of the hollow rubber body the wall is thinnest so that when compressing the body the ring extends in its middle part and the walls 5 and 5' of the cavity 4 come to rest on each other, as is shown later. When the hollow rubber body is put under load a certain work to change the shape of said body has to be done, whereby a good absorbing effect is obtained.

Preferably the suspension system according to the invention may be used on vehicles, especially motor vehicles, and in conjunction with the normal vehicle steel springs. The rubber suspension is arranged in a way that it comes into effect only after a certain deflection of the vehicle springs (leaf springs, coil springs, or torsion springs). A relatively short travel of the rubber spring is then required, which amounts to a fraction of the total travel of the vehicle spring system.

As a suspension for vehicles the hollow rubber body works perfectly. It is a soft and progressive springing which may be supplemented by an additional absorber if the damping qualities of the rubber itself do not suffice.

Figure 2:
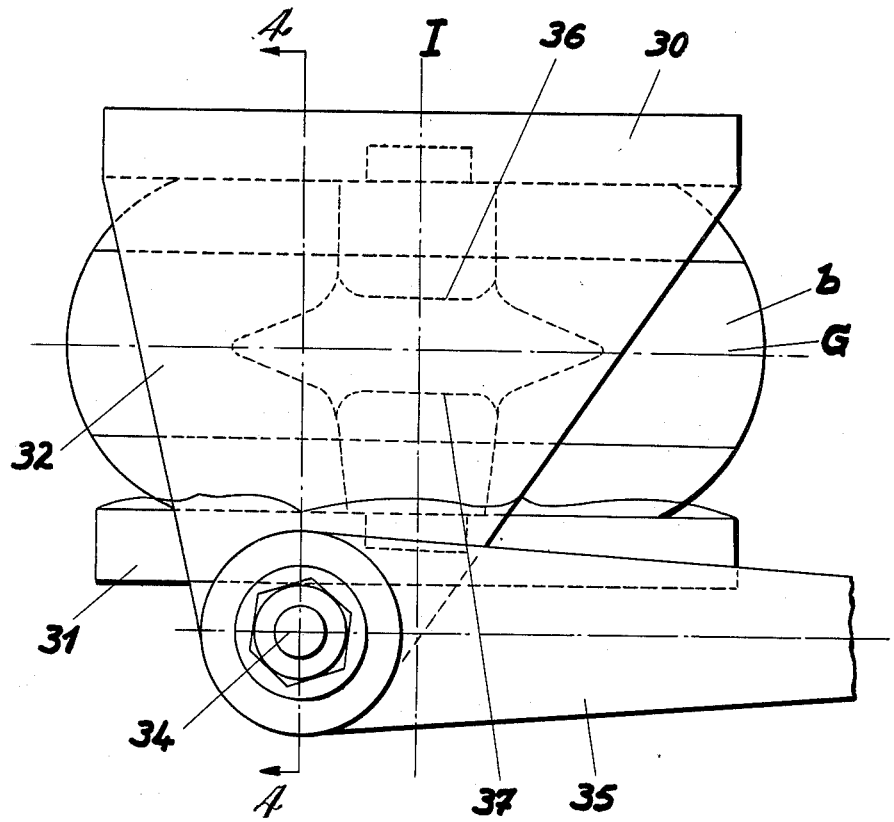
Fig. 2 is a side elevational view of one application of the present invention.

Figs. 2, 3, and 4 represent a suspension arrangement in which the rubber body acts as a spring and as an absorber at the same time. For this purpose the rubber body G is fixed, under a certain pre-load, between two plates 30 and 31. On plate 30 there are two U-shaped side flanges 32 which enclose the rubber body G. Both flanges 32 carry a shaft 34 on which the plate 31 is rigidly mounted. At the same time shaft 34 is splined to arms 35. Their free end is fitted to the part to be suspended, for instance, the wheel assembly. Plate 30 is mounted on the chassis.

Figs. 2 and 3 illustrate that the shaft 34 is outside the center line I—I of the rubber body G so that loads on said body come in eccentrically. To lock the rubber body G against lateral movement plates 30 and 31 are provided with pins 36 and 37 which fit into the openings of said body G, and at the same time serve as fixing means.

Due to the particular arrangement of the rubber body G it is achieved that when the suspension is put to operation one part of the hollow rubber body G is compressed and the other part is relieved. This is the reason why the same hollow rubber body does the work of a spring and of an absorber. Because of the eccentric arrangement of the arm 35 and, respectively, the plate 31 that part of said rubber body G is compressed which is supported on plate portion E, when the arm 35 pivots in clockwise direction, and that part of the rubber body G which is supported on plate portion D is relieved. If the arm 35 pivots in the opposite direction, as for instance, into a position shown in dotted lines in Fig. 3, the effect is also opposite. Each pivoting movement of the arm 35 causes a change in the compression ratio of the rubber body and one part of said body acts as a spring and the other as an absorber.

It is of particular advantage to combine several hollow rubber bodies into one suspension system. The plates 30 and 31 of Fig. 2 may be extended, for instance, so that several rubber bodies can be arranged side by side between the plates (Fig. 7). The rubber bodies are now placed side by side and transverse to shaft 34 and are under a certain pre-load. A number of the rubber bodies, the smaller number for instance, is located on the left side of shaft 34 while the other part, the bigger number for instance, is on the right side of shaft 34. If, for instance, three hollow rubber bodies 9 are used, one of them could be arranged on the left side of the shaft 34 and two of them on the right side of shaft 34. By moving the rubber body or bodies 9 in relation to shaft 34 it is possible to vary the ratio of the springing and absorbing effect. Various changes in arrangement may be made (Fig. 7).

A similar arrangement with an eccentric mounting of the rubber body is partly shown in Figs. 5 and 6. In this example a plain, cylindrical hollow rubber body 40 is used which is essentially a hollow cylinder with a smooth bore from end to end.

The vehicle axle 41 which is to be suspended is arranged in a housing 42 which is provided with side plates 43. Only half of the suspension system is shown in the drawing. Each plate 43 is fixed to a U-shaped bracket 44, the sides 45 of which carry a pin 46. On the pin 46 and between the sides 45 a cylindrical bushing 47 is fitted. Said bushing 47 is rigidly secured to the lever 48 which is provided with a pressure plate 49 and the free end of said lever acts flexibly on shackle 50. Said shackle 50 is fixed in the flange 51 in the conventional way.

The plate 43 of the housing 42 of shaft 41 is bolted to bracket 44, 45 by means of bolts 52. The bracket 44 as well as plate 49 are provided with cylinder-shaped pins 53 which fit into the opening 54 of the rubber body 40, whereby lateral movement of said body is prevented.

It is important that the center of the shaft 41 is outside the center of the bolt 46. On the other hand, however, the center line of the rubber body is located exactly in the middle plane of the vehicle axle 41.

When assembling the parts the hollow rubber body 40 has been mounted, under a certain pre-load, between base plate 44 and counter plate 49. Since the center of the bolt 46 is situated outside the center-line of the rubber body 40 an eccentric mounting is obtained. This eccentric mounting enables the rubber body 40 to act as a spring as well as an absorber. Due to the pre-load the body 40 tends to equalize the stress in itself, so that the normal position of the suspension system is as shown in the drawing. The impacts are absorbed by the suspension system which tends to reach a relieved position, and the eccentric mounting of the hollow rubber body effects a damping action.

While I have disclosed several embodiments of the present invention, it is to be understood that these embodiments are given by example only and not in a limiting sense, the scope of the present invention being determined by the objects and the claims.

I claim:
1. A suspension system, especially for vehicles having parts to be suspended, comprising at least one hollow body of resilient material in the form of a ring, the inner and outer diameter of the said ring increasing towards the center of the said hollow body, fastening means comprising a first plate fixed to one of the said parts to be suspended, a first pin on the said first plate fitting into one end of the said ring-shaped hollow body of resilient material, side-flanges extending from the said plate and enclosing the said ring-shaped hollow body therebetween, a second plate disposed on the opposite side of the said ring-shaped hollow body, a second pin on the said second plate fitting into the said opposite end of the said hollow body, a shaft disposed outside of the center-line of the said ring-shaped hollow body and passing through the said side-flanges, said second plate being rigidly mounted on said shaft, the said pins locking the said hollow body of resilient material to the said two plates, and an arm secured to the said shaft, the end of the said arm being supported by another of the said parts to be suspended.

2. The suspension system, as set forth in claim 1, in which the said first and second plates are spaced apart from each other at a predetermined distance to pre-load the said hollow body of resilient material, so that upon turning the said second plate upon the said shaft the said hollow body of resilient material is alternately compressed on one side and expanded on its other side.

3. The suspension system, as set forth in claim 1, in which a plurality of the said hollow bodies of resilient material is disposed between the said first and second plates, the latter being spaced apart at a predetermined distance to pre-load the said hollow bodies, a smaller number of the said hollow bodies being disposed on one side of the said shaft than on the other side of the latter.

References Cited in the file of this patent

UNITED STATES PATENTS

| 1,579,184 | Weiland | Mar. 30, 1926 |
| 2,241,409 | Mason | May 13, 1941 |

FOREIGN PATENTS

| 527 | Great Britain | 1910 |
| 38,961 | France | May 19, 1931 |
| 989,370 | France | May 23, 1951 |
| 720,454 | Germany | May 6, 1942 |